(Model.)
G. A. MERRIAM.
HAY FORK.
No. 284,041. Patented Aug. 28, 1883.
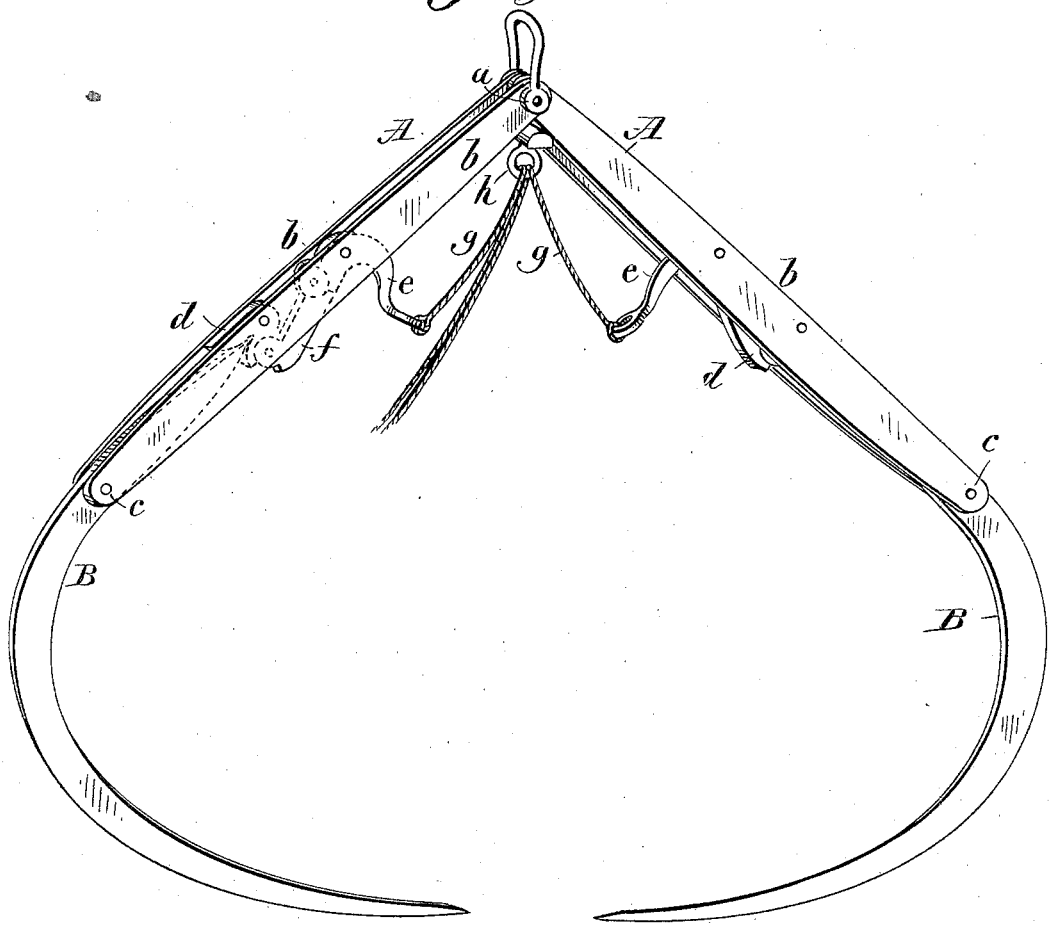
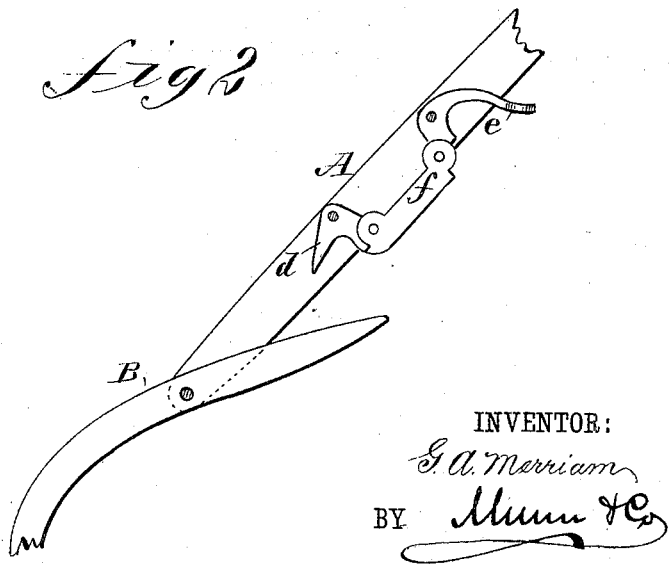
WITNESSES:
J. D. Garfield
C. Sedgwick
INVENTOR:
G. A. Merriam
BY Munn & Co.
ATTORNEYS.

UNITED STATES PATENT OFFICE.

GEORGE A. MERRIAM, OF SHARON, WISCONSIN.

HAY-FORK.

SPECIFICATION forming part of Letters Patent No. 284,041, dated August 28, 1883.

Application filed April 16, 1883. (Model.)

*To all whom it may concern:*

Be it known that I, GEORGE A. MERRIAM, of Sharon, Walworth county, and State of Wisconsin, have invented a new and Improved Hay-Fork, of which the following is a full, clear, and exact description.

My improved hay-fork consists of two arms hinged together and provided at their outer ends with pivoted tines, which are held in place when in the hay by latches or triggers fitted upon the arms of the fork, as hereinafter described and claimed.

Reference is to be had to the accompanying drawings, forming a part of this specification, in which similar letters of reference indicate corresponding parts in both figures.

Figure 1 is a side perspective view of my improved hay-fork. Fig. 2 is a sectional side view, showing the construction of the latches.

A A are the arms of the fork, attached together at one end by a pin at $a$, which is also provided with a clevis for attachment of the hoisting-rope. The arms A are each composed of two bars or plates, $b\ b$, between which and at their outer ends are pivoted the tines B by pins $c$. The inner ends of the tines B extend upward between the side plates of the arms for engagement with tumblers $d$.

$e\ e$ are latches or triggers pivoted to the arms A and connected by jointed links $f$ to the tumblers $d$. The outer ends of the latches $e$ extend inward, and to them are connected ropes $g$, that pass upward to and through an eye, $h$, at the top of the fork, and thence downward, so that when the ropes are drawn upon the ends of the latches will be raised, and by their connection to the tumblers the tumblers will be swung inward, so as to free the tines.

In the operation of the fork the points of the tines are drawn inward in the hay, and their upper ends in this position enter the slots of the tumblers $d$, and the latches $e$ being then drawn down, the tumblers are turned in such a position that outward pressure upon the ends of the tines will not move the tumblers; but when the latches are raised to the position shown in Fig. 2 the upper ends of the tines are carried inward and freed from the tumblers, so that the weight upon the tines will throw them open and release the hay.

Having thus described my invention, I claim as new and desire to secure by Letters Patent—

The pivoted levers $e$, links $f$, and tumblers $d$, combined with a hay-fork having pivoted tines B, substantially as described.

GEORGE A. MERRIAM.

Witnesses:
WM. P. ALLEN,
WILSON R. HERRON.